United States Patent [19]
Oshima et al.

[11] Patent Number: 5,401,371
[45] Date of Patent: Mar. 28, 1995

[54] HYDROGEN GENERATOR

[75] Inventors: Yujiro Oshima, Nagoya; Katsushi Abe, Aichi; Kazuo Kawahara, Nagoya; Motonobu Akaki, Anjo; Souichi Matsushita, Susono, all of Japan

[73] Assignee: Aisin Seiki Kabushiki Kaisha, Kariya, Japan

[21] Appl. No.: 91,020

[22] Filed: Jul. 14, 1993

[30] Foreign Application Priority Data

Jul. 16, 1992 [JP] Japan .................. 4-189591

[51] Int. Cl.⁶ .................. C25B 1/06; C25B 1/08
[52] U.S. Cl. .................. 204/258; 204/266
[58] Field of Search ............ 204/263, 265, 266, 257, 204/258

[56] References Cited

U.S. PATENT DOCUMENTS

| | | | |
|---|---|---|---|
| 4,210,512 | 7/1980 | Lawrance et al. | 204/258 |
| 4,589,968 | 5/1986 | Toomey, Jr. | 204/257 |
| 4,720,331 | 1/1988 | Billings | 204/257 |

FOREIGN PATENT DOCUMENTS 62-17486  5/1987  Japan .
1-287289  11/1989  Japan .
3-39493  2/1991  Japan .

*Primary Examiner*—Kathryn Gorgos
*Attorney, Agent, or Firm*—Burns, Doane, Swecker & Mathis

[57] ABSTRACT

A hydrogen generator includes a water tank adapted to form a water chamber, and a water electrolysis cell disposed in the water tank. The water electrolysis cell includes a proton conductive membrane, an oxygen generator chamber side separator adapted to form an oxygen generator chamber, and a hydrogen generator chamber side separator adapted to form a hydrogen generator chamber, and a hydrogen outlet passage adapted to discharge generated hydrogen out of the hydrogen generator chamber. The oxygen generator chamber side separator includes a communicator passage adapted to communicate the oxygen generator chamber with the water chamber. The hydrogen generator obviates the manifolds of the conventional hydrogen generators in which the generated oxygen is likely to stagnate and hinder the water supply, and accordingly it can inhibit the hydrogen gas generating capability from deteriorating.

18 Claims, 10 Drawing Sheets

(PRIOR ART)

( PRIOR ART )

HYDROGEN GENERATOR

BACKGROUND OF THE INVENTION

1. Field of the Invention

The present invention relates to a hydrogen generator. In particular, the hydrogen generator comprises a water electrolysis cell which includes a proton conductor or membrane, or a plurality of the water electrolysis cells stacked together.

2. Description of the Related Art

Developments are now under way in the field of the hydrogen generation technology which utilizes the conduction phenomena or the ion exchange of cathode ions in polymer electrolytes.

FIG. 10 illustrates a construction of a conventional hydrogen generator which comprises a polymer electrolyte membrane (hereinafter referred to as a "proton conductive membrane"). For example, a proton conductive membrane 1 illustrated in FIG. 10 is made of a fluorocarbon resin having sulfonic acid groups, is provided with electrodes, e.g., platinum 2, 2, on both of the surfaces, and is a non-porous membrane. The conventional hydrogen generator comprises the proton conductive membrane 1 thus constructed, a pair of collectors 3, 4 holding the proton conductive membrane 1 therebetween, an anode terminal plate 5 connected with the collector 3, and a cathode terminal plate 6 connected with the collector 4.

Further, the conventional hydrogen generator is provided with an end plate 7 disposed therearound, and the end plate 7 is provided with a lower groove 8, a first upper groove 9 and a second upper groove 10 formed therein. Accordingly, the water to be subjected to electrolysis is introduced into the conventional hydrogen generator through a water supply port 8a of the lower groove 8, and is supplied to the collector 3 by way of the anode terminal plate 5. The collector 3 consumes some of the water to generate oxygen. The oxygen thus generated is discharged out through the first upper groove 9, again, by way of the anode terminal plate 5 together with the rest of the water.

The proton conductive membrane 1 conducts the hydrogen ions generated at the collector 3 to the cathode terminal plate 6 by way of the collector 4. The hydrogen ions thus conducted are converted into hydrogen gas at the collector 4, and are discharged out through the second upper groove 10 of the cathode terminal plate 6.

The thus constructed conventional hydrogen generator is disposed in a circulation circuit including a water tank. A predetermined voltage is applied between the anode and cathode terminal plates 5 and 6, thereby achieving a water electrolysis process which is affected less by the gas resistances and the ohomic losses. Thus, hydrogen can be generated continuously.

In the conventional hydrogen generator, when a fixed electric current flows in a unit area of the proton conductive membrane 1, the hydrogen generation increases in proportion to the area of the proton conductive membrane 1. However, the enlargement of the area of the proton conductive membrane 1 results in the increment in the overall amount of the electric current flowing in the proton conductive membrane 1, and eventually results in the upsizing of the electric power source. Consequently, the area of the proton conductive membrane 1 and the size of the electric power source are determined depending on the applications.

For instance, in the case of a conventional hydrogen generator to be boarded on a vehicle, the total area of a proton conductive membrane 1 is limited to about 100 $cm^2$, and the electric current flowing in a unit area of the proton conductive membrane is restricted to fall in a range of from 200 to 300 $mA/cm^2$. Even if such is the case, an electric current flows in an overall amount of from 20 to 30 A in such a hydrogen generator, and accordingly its battery consumes the electric current excessively.

Hence, a method has been devised in order to reduce the electric current consumed at the battery. In the method, the conventional hydrogen generator comprising the proton conductive membrane 1 is made into a cell, and a plurality of the cells are stacked. With this method, the cells can be connected in series or in parallel, and the area of the proton conductive membrane 1 per one cell can be reduced in each of the cells. Accordingly, the electric current can be consumed less at the battery while keeping a predetermined hydrogen generation. For example, in the case in which five cells are connected in series, the area of the proton conductive membrane 1 per one cell is one fifth of 100 $cm^2$, e.g., 20 $cm^2$, the unit voltage to be applied to one cell is from 2 to 2.4 V, the overall voltage to be applied is five times of the unit voltage, e.g., 10 to 12 V, and the electric current is from 4 to 6 A. As a result, the electric current capacity of the battery can be reduced remarkably.

FIG. 11 illustrates such a hydrogen generator comprising five stacked cells. As illustrated in FIG. 11, one of the cells comprises the proton conductive membrane 1, and collectors 3 and 4 disposed respectively on the bottom and top sides of the proton conductive membrane 1. The voltage is applied to the top and bottom cells by way of the terminal plates 5 and 6. Four bipolar electrode plates 11 are disposed between the cells. A manifold 12 adapted to supply the water is piped to each of the anode side collectors 3 on one of the sides (i.e., the right-hand side in the drawing), and a manifold 13 adapted to discharge the oxygen and the water is piped to each of the collectors 3 on the other side (i.e., the left-hand side in the drawing). A manifold 14 adapted to discharge the hydrogen is piped to each of the cathode side collectors 4 on one of the side (i.e., the left-hand side in the drawing).

Through the water supply manifold 12, the water is returned from the water tank (not shown) by way of an ion-exchange resin 15 and a check valve 16. The check valve 16 is operated so as to open and close depending on the pressures of the oxygen gas taken out of the discharge manifold 13. It is thus possible to control the water supply from the water tank to the hydrogen generator.

In the hydrogen generator comprising the five stacked cells, the hydrogen gas generated at the cathode sides of the cells is collected in and taken out of the manifold 14 by way of the cathode side collectors 4. The water to be subjected to electrolysis is divided into and supplied to each of the anode side collectors 3 through the manifold 12, and eventually is collected in and discharged out through the manifold 13 together with the generated oxygen.

However, in the case in which a plurality of the water electrolysis cells are stacked to use, and the generated gases are collected in the manifolds 13 and 14, there occur the differences in the gas generating capability among the cells when the contact resistances or the like fluctuate between the cells and the collectors 3, 4, between the collectors 3, 4 and the bipolar electrode plates 11, and between the bottom or top collector 3 or 4 and the bottom or top terminal plate 5 or 6, and accordingly there might arise a fear for the unbalance in the water supplies to the anode side collectors 3. The fear results from the following phenomena: Namely, the generated oxygen is usually released to the manifold 13, but it tries to go out through the water supply manifold 12. Then, when there arise the differences in the gas generating capability among the cells, the water in the manifold 12 is subjected to the oxygen gas pressure differences. As a result, it becomes hard to supply the water to the cells to which the generated oxygen exerts a large pressure.

Even when there occurs the unbalanced water supply at one of the five cells, the water can be supplied to the cell stack as a whole, as far as the other four cells are in their proper conditions, because the cells are connected by the water supply manifold 12. However, such an operation results in the further deterioration in the water supply to the particular cell, and, in an extreme case, there arises a cell to which no water is supplied at all. Thus, the operation adversely affects the overall hydrogen generating capability of the conventional hydrogen generator considerably.

In order to avoid this adverse operation, each of the cells may be provided with the check valve 16. However, if such is the case, the piping system becomes complicated, and accordingly, such a hydrogen generator is enlarged as a whole so that the advantages associated with the stacked cell construction have been lost.

In addition, the adverse operation resulting from the insufficient water supply occurs even in the conventional hydrogen generator having a single water electrolysis cell construction. Namely, there arises the circumstance that the oxygen is generated so excessively even in the single cell that the water supply cannot catch up with the excessive oxygen generation.

SUMMARY OF THE INVENTION

It is, therefore, a primary object of the present invention to solve the engineering drawbacks associated with the conventional hydrogen generators, thereby providing a hydrogen generator comprising a single water electrolysis cell into which the water can be supplied sufficiently without being adversely affected by the oxygen generation.

It is a further object of the present invention to provide a hydrogen generator comprising a plurality of stacked water electrolysis cells into which the water can be supplied evenly regardless of the fluctuations in the gas generating capabilities among the cells, thereby securing a predetermined overall gas generating capability.

A hydrogen generator according to the present invention obviates the manifolds of the conventional hydrogen generators in which the generated oxygen is likely to stagnate, and accordingly it can carry out the aforementioned objects. The present hydrogen generator comprises:

a water tank adapted to form a water chamber; and
a water electrolysis cell disposed in the water tank, and including;
  a proton conductive membrane;
  an oxygen generator chamber side separator disposed on one side of the proton conductive membrane, adapted to form an oxygen generator chamber, and including a communicator passage adapted to communicate the oxygen generator chamber with the water chamber;
  a hydrogen generator chamber side separator disposed on another side of the proton conductive membrane, and adapted to form a hydrogen generator chamber; and
  a hydrogen outlet passage adapted to discharge generated hydrogen out of the hydrogen generator chamber.

A preferred form of the present hydrogen generator can include:

the oxygen generator chamber side separator formed in a ring shape of a predetermined thickness whose inner peripheral surface defines the oxygen generator chamber;

the communicator passage formed in one of a groove, a slit and a through hole which extends from the inner peripheral surface of the ring-shaped oxygen generator chamber side separator toward an outer peripheral surface thereof;

the hydrogen generator chamber side separator formed in a ring shape of a predetermined thickness whose inner peripheral surface defines the hydrogen generator chamber; and the hydrogen outlet passage including a main outlet passage which penetrates through the ring-shaped hydrogen generator chamber side separator in the thickness-wise direction thereof, and an auxiliary outlet passage which connects the main outlet passage with the inner peripheral surface of the ring-shaped hydrogen generator chamber side separator and which is formed in one of a groove, a cut-off and a hole.

The ring shape herein is not limited to the one having a doughnut shape whose inner and outer boundaries are formed in rings. For example, it involves a squared ring shape whose inner and outer boundaries are formed in rectangles as illustrated in FIG. 12. Further, the inner and outer boundaries of the ring shape can be defined with the combinations of rings and rectangles as illustrated in FIGS. 13 and 14.

In the present hydrogen generator, the water electrolysis cell comprising the proton conductive membrane is disposed in the water tank. Accordingly, the water can be supplied through the communicator passage which is provided in the oxygen generator chamber side separator and which is formed in one of a groove or through hole, and at the same time the oxygen and the water are evacuated through the communicator passage. As a result, the water can go in and out the oxygen generator chamber freely without being affected by the oxygen gas generated. On the other hand, the hydrogen gas can be taken out of the water tank through the hydrogen outlet passage which is formed in the hydrogen generator chamber side separator, which includes the main and auxiliary outlet passages and which operates like a manifold.

As having been described so far, the present invention enables the water electrolysis cell to be disposed or immersed in the water of the water tank. Consequently, it is unnecessary to independently provide the present hydrogen generator with the water supply manifold, the oxygen and water discharge manifold and the hydrogen discharge manifold which have been required by the conventional hydrogen generators.

In particular, in the present hydrogen generator, the water supply and the water discharge can be carried out through the same passage. As a result, even when the present hydrogen generator comprises a single water electrolysis cell or a plurality of stacked water electrolysis cells, the present hydrogen generator can freely take the water in and take it out from the oxygen generator chamber and an oxygen generator chamber side collector disposed adjacent thereto without being adversely affected by the generated oxygen gas.

All in all, the present hydrogen generator produces an advantageous effect in that it can inhibit the hydrogen gas generating capability from deteriorating.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Figure 1:
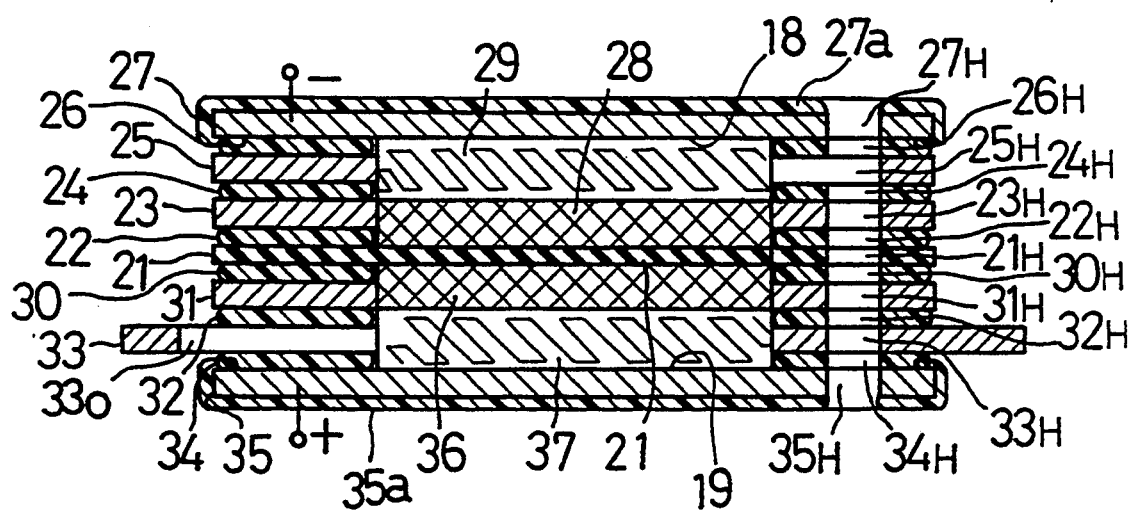
FIG. 1 is a cross-sectional view of a First Preferred Embodiment of a hydrogen generator according to the present invention.

Having generally described the present invention, a further understanding can be obtained by reference to the specific preferred embodiments which are provided herein for purposes of illustration only and are not intended to limit the scope of the appended claims.

First Preferred Embodiment

The First Preferred Embodiment of a hydrogen generator according to the present invention will be hereinafter described with reference to FIGS. 1 and 2. The drawings illustrate the present hydrogen generator comprising a single water electrolysis cell. In the drawings, a membrane 21 is disposed at the center of the present hydrogen generator, and is made of a proton conductive membrane. In particular, a construction of the hydrogen generator chamber side is illustrated on the upper side with respect to the membrane 21 in FIG. 1, and a construction of the oxygen generator chamber side is illustrated on the lower side with respect to the membrane 21 in FIG. 1.

The construction of the hydrogen generator chamber side includes a ring-shaped resilient member 22, a separator 23, a packing 24, a separator 25, a packing 26, and a disk-shaped cathode terminal plate 27. These component members are connected with each other. The separators 23 and 25 mainly construct the hydrogen generator chamber side separator, thereby forming a hydrogen generator chamber 18. In the hydrogen generator chamber 18, there are accommodated a major collector 28 and an expanded collector 29, the two of which function as a collector.

Similarly, the construction of the oxygen generator chamber side includes a ring-shaped resilient member 30, a separator 31, a packing 32, a separator 33, a packing 34, and a disk-shaped anode terminal plate 35. These component members are connected with each other. The separators 31 and 33 mainly construct the oxygen generator chamber side separator, thereby forming an oxygen generator chamber 19. In the oxygen generator chamber 19, there are accommodated a major collector 36 and an expanded collector 37, the two of which function as a collector.

The major collectors 28, 36, the expanded collectors 29, 37, the membrane 21 and the cathode and anode terminal plates 27, 35 are put into a connected state by a fastening force. The fastening force is produced by fastening the cathode and anode terminal plates 27, 35 with bolts and nuts (not shown).

Figure 2:
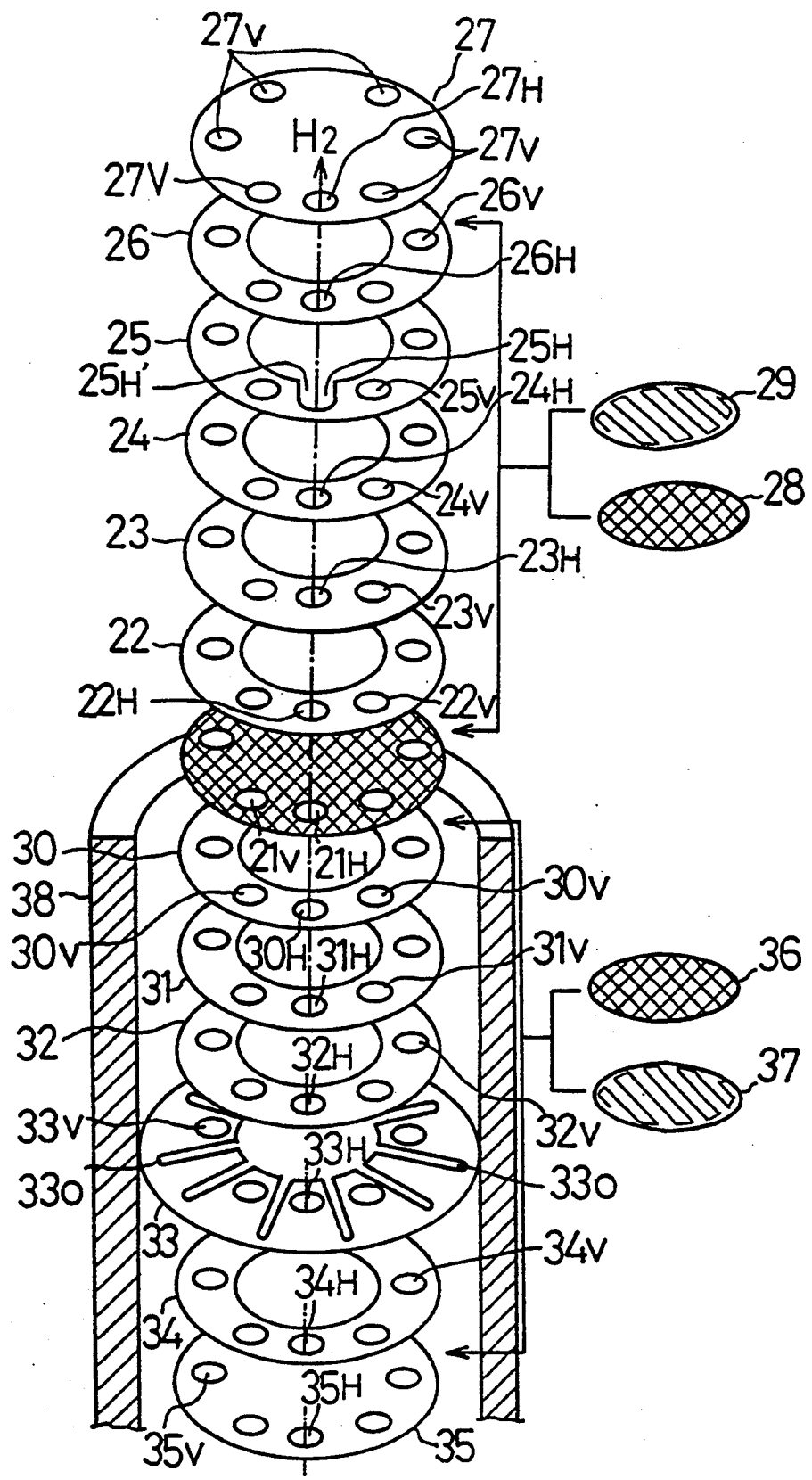
FIG. 2 is an exploded perspective view of the First Preferred Embodiment of the present hydrogen generator whose component parts are disassembled.

As illustrated in FIG. 2, each of the component parts is provided with six fastening through holes $27_V$, $26_V$, $25_V$, $24_V$, $23_V$, $22_V$, $21_V$, $30_V$, $31_V$, $32_V$, $33_V$, $34_V$, $35_V$ which are adapted for the fastening with the bolts and nuts, which are spaced equally at 6 positions on each of the ring-shaped peripheral portions, and which are aligned with the fastening through holes of the neighboring component parts in the circumferential direction. Further, each of the component parts is provided with a hydrogen outlet through hole $27_H$, $26_H$, $25_H$, $24_H$, $23_H$, $22_H$, $21_H$, $30_H$, $31_H$, $32_H$, $33_H$, $34_H$, $35_H$, all of which constitute the hydrogen outlet passage according to the present invention, which are communicated with each other, and which are aligned with the hydrogen outlet through hole of the neighboring component parts in the circumferential direction.

Figure 15:
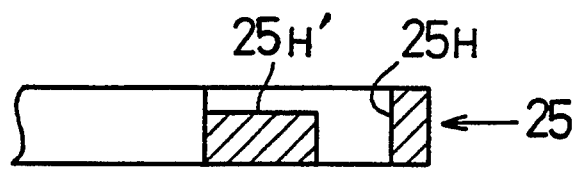
FIG. 15 is a schematic cross-sectional view in part illustrating a modified form of an auxiliary outlet passage in a hydrogen generator chamber side separator constructed in accordance with the present invention.
Figure 16:
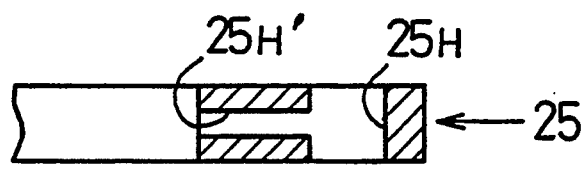
FIG. 16 is a schematic cross-sectional view in part illustrating another modified form of an auxiliary outlet passage in a hydrogen generator chamber side separator constructed in accordance with the present invention.

As illustrated in FIG. 2, one of the hydrogen outlet through holes $27_H$ through $21_H$ and $30_H$ through $35_H$, e.g., the hydrogen outlet through hole $25_H$ of the separator 25 includes an auxiliary outlet through hole $25_H$, which extends toward the inner peripheral surface of the separator 25 and which is formed in a cut-off. The auxiliary outlet through hole $25_H$, can be formed in a groove as illustrated in FIG. 15, or it can be formed in a hole drilled through as illustrated in FIG. 16. Thus, when the cathode and anode terminal plates 27, 35 are fastened with bolts and nuts, the generated hydrogen gas can be discharged out to the hydrogen outlet passage, which is constituted with the hydrogen outlet through holes $27_H$ through $21_H$ and $30_H$ through $35_H$ communicating with each other, by way of the hydrogen outlet through hole $25_H$ and the auxiliary outlet through hole $25_H$, of the separator 25.

Further, the separator 33 disposed on the oxygen generator chamber side has an outside diameter which is larger than those of the other component parts as illustrated in FIG. 1. For instance, as illustrated in FIG. 2, the separator 33 has an outside diameter which is equal to an inside diameter of the water tank 38. In this First Preferred Embodiment of the present hydrogen generator, the separator 33 is constructed in this manner because it is adapted to position the above-described water electrolysis cell at a predetermined location in the water tank 38 when assembling the water electrolysis cell with the water tank 38. Naturally, either one of the other separators 25, 23 and 31 can be constructed in this manner, and it can take over the positioning function of the separator 33.

Figure 17:
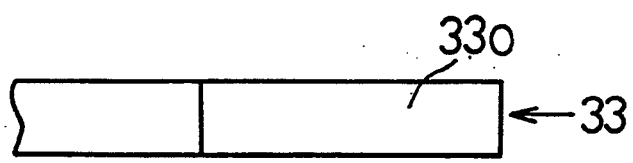
FIG. 17 is a schematic cross-sectional view in part illustrating a modified form of a communicator passage in an oxygen generator chamber side separator constructed in accordance with the present invention.
Figure 18:
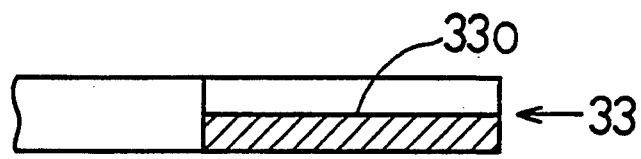
FIG. 18 is a schematic cross-sectional view in part illustrating another modified form of a communicator passage in an oxygen generator chamber side separator constructed in accordance with the present invention.
Figure 19:
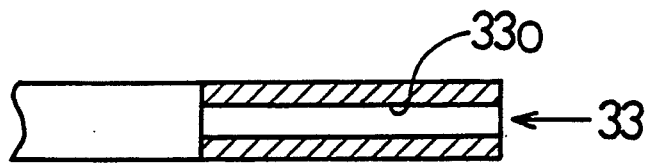
FIG. 19 is a schematic cross-sectional view in part illustrating a still another modified form of a communicator passage in an oxygen generator chamber side separator constructed in accordance with the present invention.

Furthermore, as illustrated in FIG. 2, the separator 33 is provided with twelve communicator passages $33_O$ which communicate with the water chamber of the water tank 38. The communicator passages $33_O$ are formed in a slit which extends from the inner peripheral surface of the separator 33 toward the outer peripheral surface thereof and terminates at a slightly inward position with respect to the outer peripheral surface thereof. Thus, the leading ends of the communicator passages $33_O$ are constructed so as to extend beyond the outer peripheral surfaces of the other component parts, and thereby the communicator passages $33_O$ are communicated with the water chamber of the water tank 38. Alternatively, the communicator passages $33_O$ can be extended all the way to the outer peripheral surface of the separator 33 as illustrated in FIG. 17. In addition, the communicator passages $33_O$ can be formed in a groove as illustrated in FIG. 18, or they can be formed in a hole drilled through as illustrated in FIG. 19.

As described earlier, in the hydrogen and oxygen generator chambers 18, 19, there are accommodated the major collectors 28, 36 and the expanded collectors 29, 37. The expanded collectors 29, 37 are accommodated therein in order to secure sufficient collector spaces and to inhibit the fastening force exerted on the membrane 21 from being degraded by the deteriorated packings 24, 26, 32, 34, or the like.

The major collectors 28, 36, the expanded collectors 29, 37, and the cathode and anode terminal plates 27, 35 are made of titanium. The separators 25, 23, 31, 33 are made of polyvinyl resin or the like which is resistant to acids. The resilient members 22, 30 and the packings 24, 26, 32, 34 are made of rubber such as silicone rubber or the like, and they are disposed in order to isolate the hydrogen outlet through hole $25_H$ from the water in the water tank 38 and not to soak the bolts disposed in the fastening through holes $27_V$ through $21_V$ and $30_V$ through $35_V$ with the water in the water tank As illustrated in FIG. 1, the cathode and anode terminal plates 27, 35 are covered with an insulating resin 27a, 35a on the outer peripheral portions, the outside surfaces, and inside walls of the fastening through holes $27_V$, $35_V$.

The thus constructed First Preferred Embodiment of the present hydrogen generator, comprising the single water electrolysis cell, is disposed or immersed in the water tank 38 so as to horizontally place the component parts. Then, the hydrogen outlet passage, constituted by the hydrogen outlet through holes $27_H$ through $21_H$ and $30_H$ through $35_H$, is connected to piping which is communicated with the outside of the water tank 38. Hence, as can be appreciated from FIG. 1, the hydrogen gas generated at the collectors 28, 29 can be taken out by way of the hydrogen outlet passage, i.e., the hydrogen outlet through holes $27_H$ through $21_H$ and $30_H$ through $35_H$. On the other hand, the oxygen generated at the collectors 36, can be turned into bubbles at the communicator passages $33_O$ of the separator 33, and can ascend in the water of the water tank In the First Preferred Embodiment of the present hydrogen generator, the separator 33 is provided with the twelve communicator passages $33_O$ which are communicated with the water tank 38 and the oxygen generator chamber 19. By way of the twelve communicator passages $33_O$, the water supply, and the oxygen discharge as well as the water discharge can be carried out simultaneously. As a result, the water in the water tank 38 can go in and out of the oxygen generator chamber 19 freely without being adversely affected by the generated oxygen gas. To put it differently, the water can be supplied to the collectors 36, 37 appropriately without being adversely affected by the generated oxygen gas.

Moreover, in the case in which the present hydrogen generator is boarded on an automobile, the generated oxygen gas can be introduced into the inlet piping system of the engine, can be supplied to an exhaust piping system at an upstream position with respect to the 3-way catalyst or the oxidizing catalyst, or can be released in the air.

Second Preferred Embodiment

The Second Preferred Embodiment of a hydrogen generator according to the present invention will be hereinafter described with reference to FIGS. 3 through 9. Hereinafter, the component parts similar to those of the First Preferred Embodiment will be designated at the like reference numerals.

Figure 3:
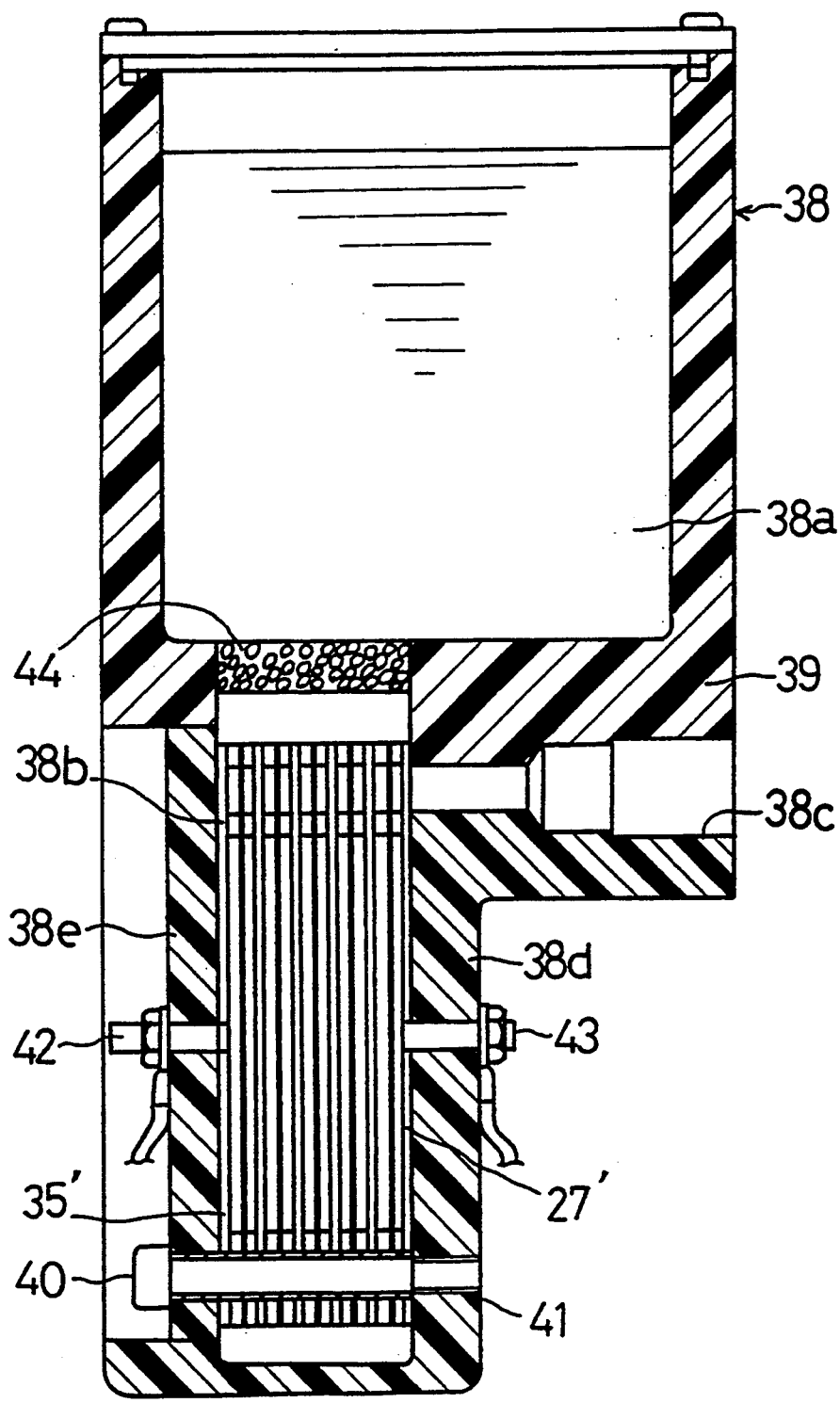
FIG. 3 is a cross-sectional view of a Second Preferred Embodiment of a hydrogen generator according to the present invention.

In the Second Preferred Embodiment of the present hydrogen generator, the water electrolysis cell constructed in accordance with that of the First Preferred Embodiment is stacked in a quantity of five, and they are disposed in an water tank 38. FIG. 3 illustrates an overall construction of the Second Preferred Embodiment. As illustrated in FIG. 3, the water tank 38 includes an upper chamber 38a, a lower chamber 38b, and a passage 38c which is adapted to take out the generated hydrogen. The passage 38c is formed under the bottom of the upper chamber 38a, and is communicated with the lower chamber 38b. The lower chamber 38b includes a concaved portion 38d whose opening is disposed vertically, and a lid-shaped detachable plate 38e which is adapted to close the opening of the lower chamber 38b. Particularly, in the Second Preferred Embodiment, the water tank 38 is made of resin so as to inhibit the water electrolysis cells from being affected electrically, and its upper chamber 38a is covered with a lid including an air vent hole (not shown).

The five stacked water electrolysis cells are disposed vertically in the lower chamber 38b, and they are fixed therein by bolts 40 and nut portions 41. The bolts 40 are inserted through the component parts of the water electrolysis cells, their heads are placed projectingly on the detachable plate 38e, and their leading ends are fastened with the nut portions 41. The nut portions 41 are formed in the concaved portion 38d of the lower chamber 38b.

Figure 4:
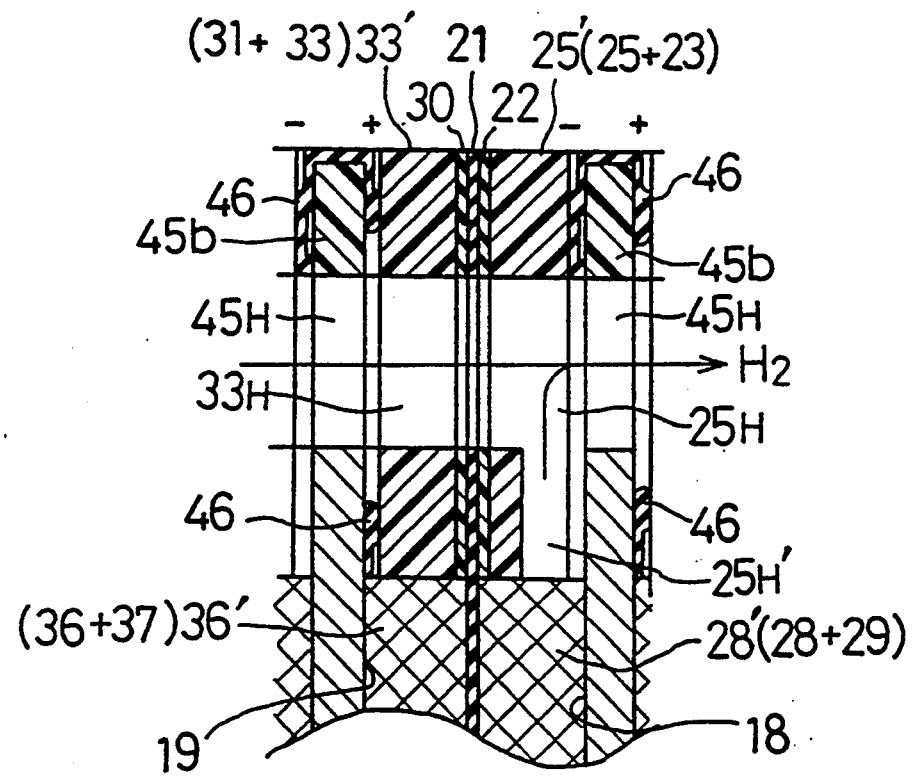
FIG. 4 is a cross-sectional view illustrating a part of a stacked water electrolysis cell construction in the Second Preferred Embodiment of the present hydrogen generator.
Figure 4:
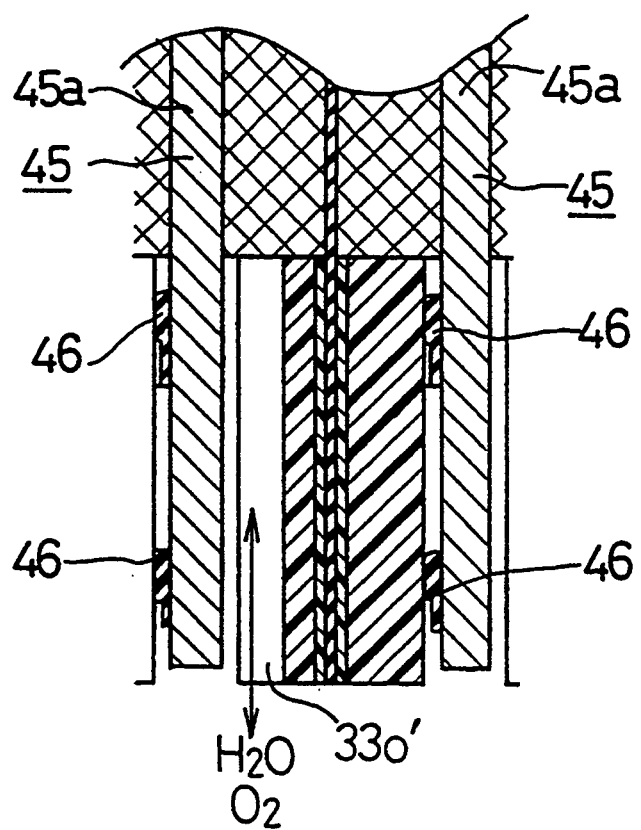

FIG. 4 illustrates an enlarged cross-sectional view of the stacked water electrolysis cell construction comprising the five stacked cells. However, in the drawing, the ends, e.g., the right-hand side end and the left-hand side end, of the stacked water electrolysis cell construction are not shown. As illustrated in FIG. 4, ring-shaped resilient members 22, 30 are disposed so as to face each other on the opposite sides of a disk-shaped membrane 21, and they hold the peripheral portion of the membrane 21 between themselves.

Figure 5:
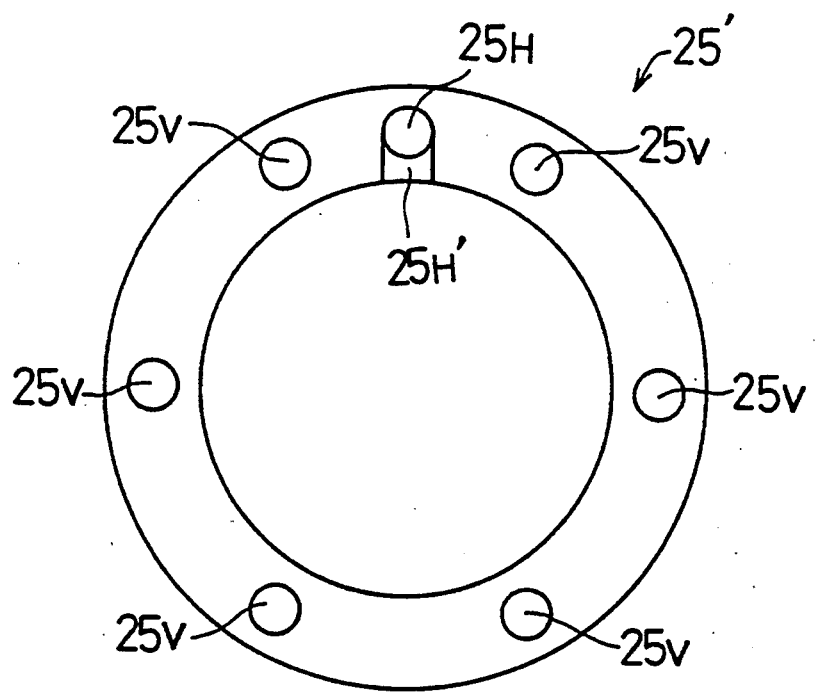
FIG. 5 is a plan view of a hydrogen generator chamber side separator employed by the Second Preferred Embodiment of the present hydrogen generator.

A separator 25' is connected to the resilient member 22 which is disposed on the hydrogen generator chamber side, and it is a component part which is constructed so as to integrate the separators 23 and 25 of the First Preferred Embodiment. The separator 25' constitutes the hydrogen generator chamber side separator according to the present invention. FIG. 5 illustrates the separator 25' in detail. As illustrated in FIG. 5, the separator 25' is provided with a hydrogen outlet through hole $25_H$ formed in a through hole, an auxiliary outlet through hole $25_H$, which extends toward the inner peripheral surface of the separator 25' and which is formed in a groove, and six fastening through holes $25_V$ into which the bolts 40 are inserted. The auxiliary outlet through hole $25_H$, can be formed in a cut-off as illustrated in FIG. 2, or it can be formed in a hole drilled through as illustrated in FIG. 16.

Figure 6:
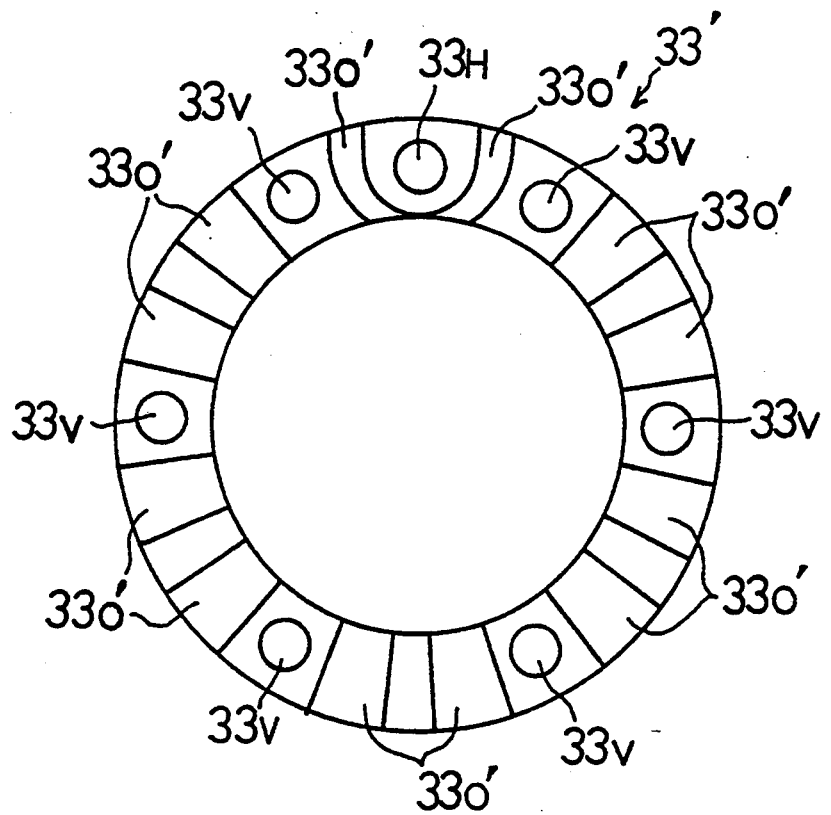
FIG. 6 is a plan view of an oxygen generator chamber side separator employed by the Second Preferred Embodiment of the present hydrogen generator.

Turning back to FIG. 4, a separator 33' is connected to the resilient member 30 which is disposed on the oxygen generator chamber side, and it is a component part which is constructed so as to integrate the separators 31 and 33 of the First Preferred Embodiment. The separator 33' constitutes the oxygen generator chamber side separator according to the present invention. FIG. 6 illustrates the separator 33' in detail. As illustrated in FIG. 6, the separator 33' is provided with twelve concaved grooves $33_O$, which correspond to the communicator passages $33_O$ of the separator 33 of the First Preferred Embodiment, a hydrogen outlet through hole $33_H$, and six fastening through holes $33_V$ into which the bolts 40 are inserted. The grooves $33_O$, can be formed in a slit as illustrated in FIG. 2, or they can be formed in a through hole as illustrated in FIG. 19.

Further, as illustrated in FIG. 4, the hydrogen generator chamber side separator 25' is connected to an electrode plate 45 on the right-hand side thereof, and the oxygen generator chamber side separator 33' is connected to an electrode plate 45 on the left-hand side thereof. Each of the electrode plates 45, 45 operates as a bipolar electrode with respect to the neighboring water electrolysis cells.

Thus, as illustrated in FIG. 4, a hydrogen generator chamber 18 is constituted by the electrode plate 45, the separator 25' and the membrane 21 on the hydrogen generator chamber side of the membrane 21, e.g., on the right-hand side in the drawing. In the hydrogen generator chamber 18, there are accommodated a collector 28' which is constructed so as to integrate the major collector 28 and the expanded collector 29 of the First Preferred Embodiment. On the other hand, an oxygen generator chamber 19 is constituted by the electrode plate 45, the separator 33' and the membrane 21 on the oxygen generator chamber side of the membrane 21, e.g., on the left-hand side in the drawing. Similarly, in the oxygen generator chamber 19, there are accommodated a collector 36' which is constructed so as to integrate the major collector 36 and the expanded collector 37 of the First Preferred Embodiment.

Figure 7:
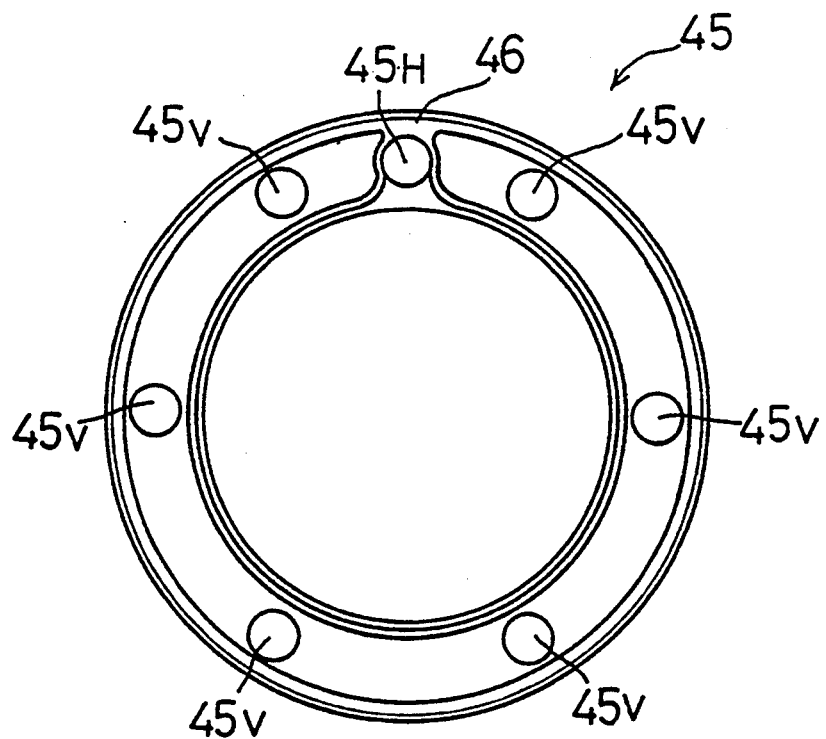
FIG. 7 is a plan view of a bipolar electrode plate, employed by the Second Preferred Embodiment of the present hydrogen generator, whose hydrogen generator chamber side is faced upward.
Figure 8:
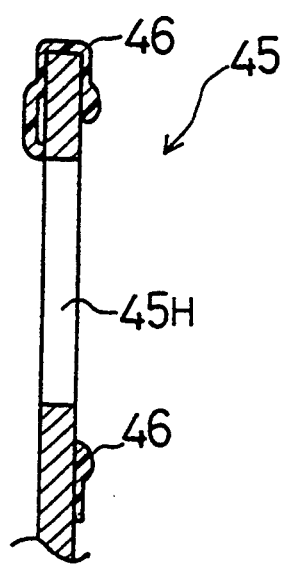
FIG. 8 is an enlarged cross-sectional view of the bipolar electrode plate illustrating a portion thereof provided with a hydrogen outlet through hole adapted to evacuate the generated hydrogen.
Figure 9:
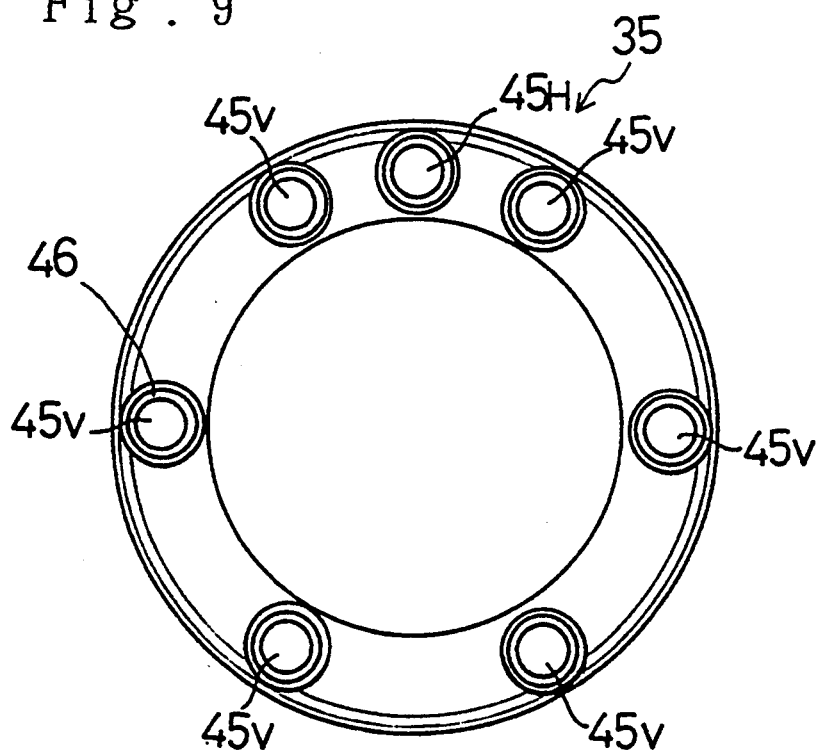
FIG. 9 is a plan view of the bipolar electrode plate whose oxygen generator chamber side is faced upward.
Figure 10:
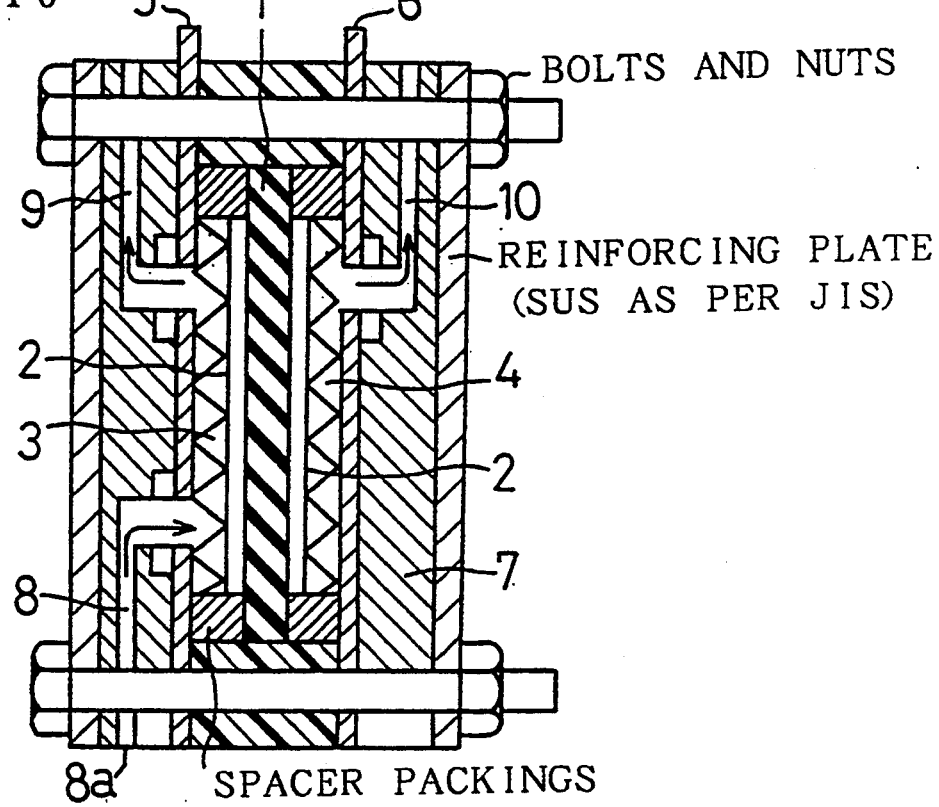
FIG. 10 is a cross-sectional view of the conventional hydrogen generator comprising a single proton conductive membrane.
Figure 11:
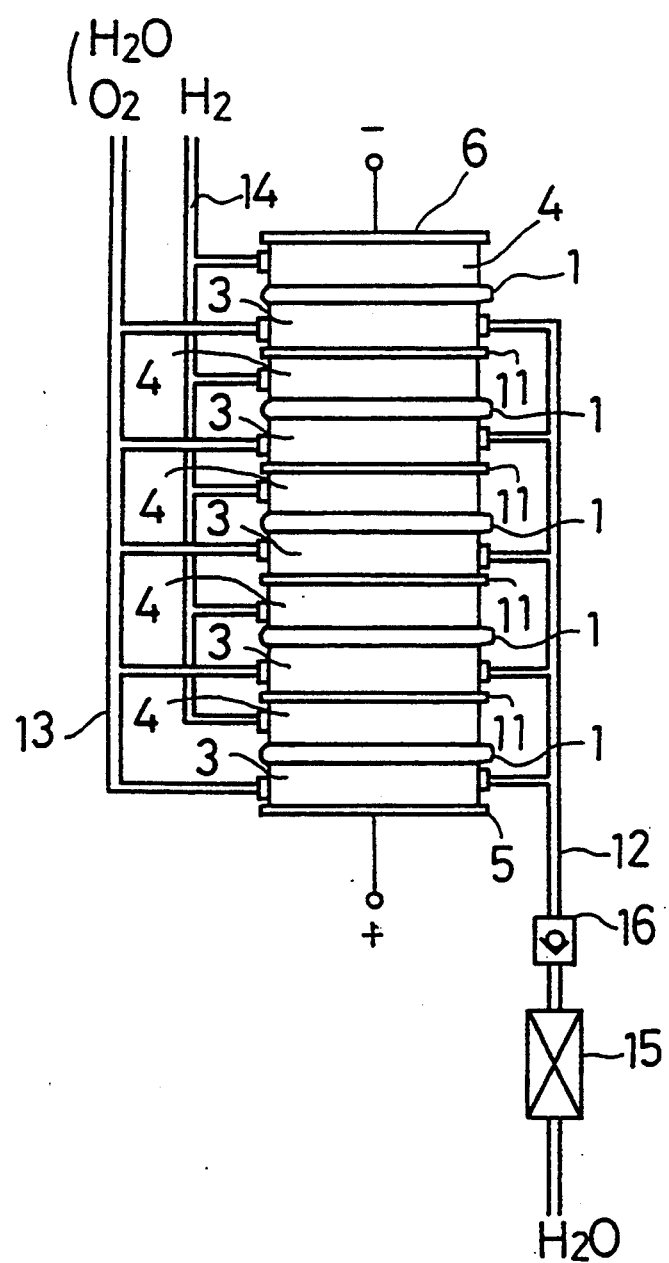
FIG. 11 is a block diagram illustrating the construction of the other conventional hydrogen generator comprising a plurality of the single water electrolysis cells stacked in series.
Figure 12:
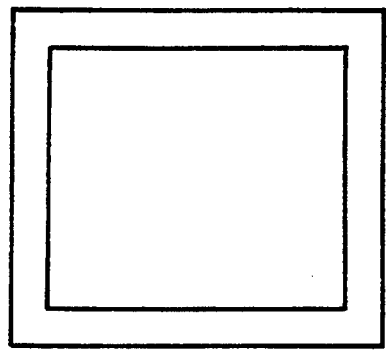
FIG. 12 is a schematic plan view illustrating a modified form of a hydrogen generator chamber side separator and an oxygen generator chamber side separator constructed in accordance with the present invention.
Figure 13:
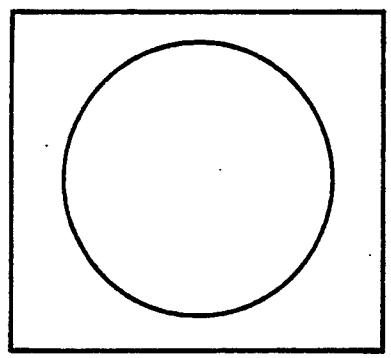
FIG. 13 is a schematic plan view illustrating another modified form of a hydrogen generator chamber side separator and an oxygen generator chamber side separator constructed in accordance with the present invention.
Figure 14:
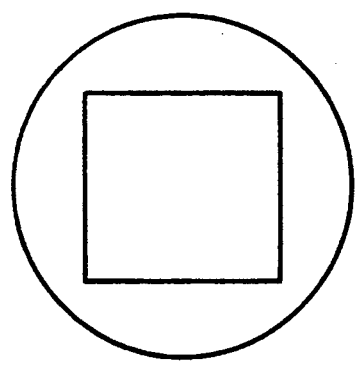
FIG. 14 is a schematic plan view illustrating a still another modified form of a hydrogen generator chamber side separator and an oxygen generator chamber side separator constructed in accordance with the present invention.

Each of the electrode plates 45, 45 includes an electrode body 45a, and a ring member 45b made of resin. The electrode body 45a is formed so that it has a diameter virtually identical with the diameter of the collectors 28', 36' and it is engaged with the ring member 45b. As illustrated in FIGS. 7 through 9, the ring member 45b is provided with a hydrogen outlet through hole $45_H$, and six fastening through holes $45_V$ into which the bolts 40 are inserted. In addition, a rubber member 46 is bonded to the ring member 45b of the electrode plates 45, 45. The rubber member 46 is disposed in order to separate the outer peripheral surfaces of the electrode plates 45, 45, the hydrogen outlet through hole $45_H$ and the bolts 40 disposed in the fastening through holes $45_V$ from the water in the water tank 38, and accordingly it corresponds to the packings 24, 26, 32, 34 of the First Preferred Embodiment.

In the Second Preferred Embodiment of the present hydrogen generator, as can be understood from FIG. 4, the five stacked water electrolysis cells are formed by repeatedly disposing the electrode plate 45, the oxygen generator chamber side separator 33' and collector 36', the resilient member 30, the membrane 21, the resilient member 22, the hydrogen generator chamber side separator 25' and collector 28', and the electrode 45 in this order from the left-hand side of FIG. 4 to the righthand side thereof in this order five times. Accordingly, the hydrogen outlet through holes $45_H$, $33_H$, $25_H$ and $45_H$ are communicated with each other so as to constitute the main hydrogen outlet passage according to the present invention, and they constitute the hydrogen outlet passage together with the auxiliary outlet through hole $25_H$. Further, the concaved grooves $33_o$, communicate with the water chamber of the water tank 38, thereby constituting a plurality of the communicator passages according to the present invention. In particular, since the five water electrolysis cells are stacked vertically in the Second Preferred Embodiment, the communicator passages formed in the concaved grooves $33_o$, constitute the oxygen inlet and outlet passages which are disposed vertically, and which direct radially in the twelve directions.

Turning back to FIG. 3, a terminal plate 35', i.e., an anode terminal plate, is connected to one of the water electrolysis cells disposed at the left-hand side end of the drawing and facing the detachable plate 38e. The terminal plate 35' is connected electrically to a wiring bolt 42 which is provided so as to penetrate through the detachable plate 38e. A terminal plate 27', i.e., a cathode terminal plate, is connected to one of the water electrolysis cells disposed at the right-hand side end of the drawing and facing the bottom surface of the concaved portion 38d of the lower chamber 38b. The terminal plate 27' is connected electrically to a wiring bolt 43 which is provided so as to penetrate through the bottom wall of the concaved portion 38d of the lower chamber 38b. The bolts 42, 43 are respectively subjected to the application of an anode voltage and a cathode voltage which are transmitted from an electric power source (not shown). Similarly to the terminal plates 27, 35 of the First Preferred Embodiment, the terminal plates 27', 35' are covered with an insulating resin on their outer peripheral portions, outer side surfaces and the inner walls of the fastening through holes.

In addition, there is disposed an ion-exchange resin 44 at the boundary between the upper chamber 38a and the lower chamber 38b in order to remove the cations from the water in the upper chamber 38a of the water tank 38 in particular. The ion-exchange resin 44 is provided because the membranes 21 are chemically susceptible to the cations.

The thus constructed Second Preferred Embodiment of the present hydrogen generator is operated as follows. Similarly to the aforementioned First Preferred Embodiment, in the Second Preferred Embodiment, the hydrogen outlet through holes $45_H$, $33_H$, $25_H$ and $45_H$ formed in the component parts and disposed repeatedly in this order, constitute the hydrogen outlet passage, which is adapted to operate as a manifold. As a result, the hydrogen outlet passage collects the generated hydrogen and conveys it to the hydrogen taken-out passage 38c. By connecting a pipe (not shown) to the outlet of the passage 38c, the hydrogen can be delivered out in a required amount.

On the other hand, the twelve concaved grooves $33_o$, are formed radially in each of the oxygen chamber side separators 33', and they allow the water in the water tank 38 to go in and out of the oxygen generator chambers 19 freely. The generated oxygen can be turned into bubbles at the twelve concaved grooves $33_o$, in each of the separators 33', and the bubbles can ascend from the lower chamber 38b to the upper chamber 38a by way of the ion-exchange resin 44. Particularly, in the Second Preferred Embodiment, the generated oxygen is mainly discharged through the concaved grooves $33_o$, disposed on the upper side in the drawing. As a result, the water is supplied to the oxygen generator chambers 19 through the concaved grooves $33_o$, disposed on the lower side in the drawing where the water is affected less by the generated oxygen. Therefore, in the Second Preferred Embodiment, there hardly arises a water electrolysis cell to which no water is supplied.

The Second Preferred Embodiment of the present hydrogen generator comprises the five water electrolysis cells stacked in series. However, the present invention is not limited thereto, a hydrogen generator comprising a plurality of the water electrolysis cells connected paralelly is also involved in the scope of the present invention.

All in all, the present invention thus contributes to providing a hydrogen generator in which the water supply is scarcely hindered., which can be operated by a small size electric power source of a small electric current capacity, and which enables to accommodate a plurality of stacked water electrolysis cells in a compact volume.

Having now fully described the present invention, it will be apparent to one of ordinary skill in the art that many changes and modifications can be made thereto without departing from the spirit or scope of the present invention as set forth herein including the appended claims.

We claim:

1. A hydrogen generator, comprising:
 a water tank forming a water chamber therein; and
 a water electrolysis cell disposed in said water tank, and including;
  a proton conductive membrane;
  an oxygen generator chamber side separator disposed on one side of said proton conductive membrane, said oxygen generator chamber side separator is formed in a ring shape having an inner peripheral surface and an outer peripheral surface, the inner peripheral surface defining an oxygen generator chamber, said oxygen generator chamber side separator including a communicator passage communicating the oxygen generator chamber with said water chamber, the communicator passage extending from the inner peripheral surface toward the outer peripheral surface to thereby discharge unreacted water and generated oxygen from the oxygen generator chamber;
  a hydrogen generator chamber side separator disposed on another side of said proton conductive membrane, said hydrogen generator chamber side separator is formed in a ring shape having an inner peripheral surface and an outer peripheral surface, the inner peripheral surface defining a hydrogen generator chamber; and
  a hydrogen outlet passage including a main outlet passage penetrating through said hydrogen generator chamber side separator in a thickness-wise direction thereof and an auxiliary outlet passage connecting the main outlet passage with said inner peripheral surface of said hydrogen generator chamber side separator to thereby discharge unreacted water and generated hydrogen from said hydrogen generator chamber to the water chamber.

2. The hydrogen generator according to claim 1, wherein said communicator passage comprises a groove, a slit or a through hole.

3. The hydrogen generator according to claim 1 including a plurality of said water electrolysis cells stacked together.

4. The hydrogen generator according to claim 1, wherein said water electrolysis cell is disposed horizontally in said water tank.

5. The hydrogen generator according to claim 1, wherein said water electrolysis cell is disposed vertically in said water tank.

6. The hydrogen generator according to claim 1 further including a collector disposed in said oxygen generator chamber, and another collector disposed in said hydrogen generator chamber.

7. The hydrogen generator according to claim 1, wherein said water tank is made of resin.

8. The hydrogen generator according to claim 1, wherein said oxygen generator chamber side separator includes a plurality of said communicator passages which extend radially from the inner peripheral surface to the outer peripheral surface.

9. The hydrogen generator according to claim 8, wherein said communicator passages are spaced equally at a plurality of positions.

10. The hydrogen generator according to claim 1, wherein said oxygen generator chamber side separator has an outside diameter which is larger than that of said hydrogen generator chamber side separator.

11. The hydrogen generator according to claim 10, wherein said outside diameter is equal to an inside diameter of said water tank.

12. The hydrogen generator according to claim 1, wherein said communicator passage terminates at an inward position with respect to said outer peripheral surface of said ring-shaped oxygen generator chamber side separator.

13. The hydrogen generator according to claim 1, wherein said communicator passage extends all the way from said inner peripheral surface of said right-shaped oxygen generator chamber side separator to said outer peripheral surface of said oxygen generator chamber side separator.

14. The hydrogen generator according to claim 1, wherein either said ring-shaped oxygen generator chamber side separator or said ring-shaped hydrogen generator chamber side separator includes inner and outer boundaries which are formed as rectangles.

15. The hydrogen generator according to claim 1, wherein either said ring-shaped oxygen generator chamber side separator or said ring-shaped hydrogen generator chamber side separator includes an inner boundary which is formed as a ring, and an outer boundary which is formed as a rectangle.

16. The hydrogen generator according to claim 1, wherein either said ring-shaped oxygen generator chamber side separator or said ring-shaped hydrogen generator chamber side separator includes an inner boundary which is formed as a rectangle, and an outer boundary which is formed as a ring.

17. The hydrogen generator according to claim 1, wherein said auxiliary outlet passage of said hydrogen outlet passage is formed as a groove, a cut-off or a hole.

18. The hydrogen generator according to claim 1, wherein said main outlet passage further penetrates through said oxygen chamber side separator in the thickness-wise direction of the oxygen chamber side separator.

* * * * *